United States Patent
Fiedler et al.

(10) Patent No.: US 7,739,778 B2
(45) Date of Patent: Jun. 22, 2010

(54) HIGH-PERFORMANCE CUTTING AND TURNING MACHINE AND METHOD FOR MACHINING PARTICULARLY SPECTACLE LENSES

(75) Inventors: Udo Fiedler, Lahnau (DE); Manfred Hanisch, Huettenberg (DE); Karl-Heinz Tross, Ehringshausen (DE); Steffen Wallendorf, Giessen (DE); Holger Schaefer, Weilmuenster (DE)

(73) Assignee: Satisloh GmbH, Wetzlar (DE)

( * ) Notice: Subject to any disclaimer, the term of this patent is extended or adjusted under 35 U.S.C. 154(b) by 1087 days.

(21) Appl. No.: 11/415,334

(22) Filed: May 1, 2006

(65) Prior Publication Data

US 2006/0260448 A1 Nov. 23, 2006

(30) Foreign Application Priority Data

May 6, 2005 (DE) .................. 10 2005 021 639

(51) Int. Cl.
  *B23P 23/02* (2006.01)
  *B23Q 39/02* (2006.01)
  *B23Q 41/02* (2006.01)
  *B23Q 7/00* (2006.01)
  *B23Q 1/01* (2006.01)
(52) U.S. Cl. .................. 29/27 C; 248/639; 248/638; 248/615; 248/618; 248/679; 82/124; 82/129; 82/149; 82/163; 82/1.11; 409/141; 409/235; 409/166; 409/132; 29/557
(58) Field of Classification Search .............. 29/27 C, 29/27 R, 557–558; 248/615, 618, 616, 638, 248/639, 678, 679; 82/124, 129, 142, 149, 82/163, 1.11; 409/141, 235, 158, 165–166, 409/131–132; 451/42, 255–256, 325
See application file for complete search history.

(56) References Cited

U.S. PATENT DOCUMENTS

| 2,994,164 | A | 8/1961 | Dalton |
| 4,520,596 | A | 6/1985 | Otto et al. |
| 4,662,119 | A | 5/1987 | Kojima |
| 4,829,716 | A | 5/1989 | Ueda et al. |

(Continued)

FOREIGN PATENT DOCUMENTS

DE     120146 A1    6/1976

(Continued)

*Primary Examiner*—Erica E Cadugan
(74) *Attorney, Agent, or Firm*—Reising Ethington P.C.

(57) ABSTRACT

A method for machining particularly spectacle lenses by means of a machine which comprises at least one cutting unit and at least one turning unit in a common working space, wherein at least two spectacle lenses are machined at the same time in the working space, one of said spectacle lenses being cut while the other is turned. The machine frames of the cutting unit and of the turning unit are essentially decoupled from one another in terms of vibration and/or at least two machining units of the machine comprise workpiece spindle units for generating a transverse movement of the spectacle lens to be machined with respect to the respective tool, the workpiece spindle units being arranged essentially perpendicular to one another. As a result, it is possible for spectacle lenses to be machined in an extremely short time with high machining performance and with high surface precision and quality.

15 Claims, 11 Drawing Sheets

U.S. PATENT DOCUMENTS

| | | | |
|---|---|---|---|
| 5,168,609 A * | 12/1992 | Kojima et al. | 29/27 R |
| 5,313,694 A * | 5/1994 | Yonemoto et al. | 29/27 R |
| 5,919,013 A * | 7/1999 | Savoie | 409/141 |
| 5,938,381 A | 8/1999 | Diehl et al. | |
| 6,161,457 A * | 12/2000 | Hammer | 82/121 |
| 6,695,295 B2 * | 2/2004 | Williams | 267/140.13 |
| 6,731,372 B2 * | 5/2004 | Binnard et al. | 355/53 |
| 6,991,525 B2 | 1/2006 | Diehl et al. | |
| 7,125,211 B2 * | 10/2006 | Zoran | 409/235 |
| 7,219,407 B2 * | 5/2007 | Schneider et al. | 29/27 C |
| 2001/0042424 A1 * | 11/2001 | Sheehan et al. | 82/121 |
| 2002/0006764 A1 | 1/2002 | Hanisch et al. | |

FOREIGN PATENT DOCUMENTS

| | | |
|---|---|---|
| EP | 0 882 548 A2 | 6/1998 |
| FR | 2 575 101 A1 | 12/1984 |
| JP | 59 232758 A | 12/1984 |
| WO | WO 99/33611 | 7/1999 |
| WO | WO 02/06005 A1 | 1/2002 |

* cited by examiner

HIGH-PERFORMANCE CUTTING AND TURNING MACHINE AND METHOD FOR MACHINING PARTICULARLY SPECTACLE LENSES

TECHNICAL FIELD

The present invention relates to a high-performance cutting and turning machine and to a corresponding method for machining particularly spectacle lenses. The invention relates specifically to the industrial machining of prescription surfaces of spectacle lenses made of plastics, such as polycarbonate, CR39 and so-called "High Index" materials.

PRIOR ART

In the machining of plastic spectacle lenses, a spectacle lens blank is usually provided which is injection-molded from plastic and has a standardised, finished convex outer surface with a spherical or progressive shape for example. The inner surface or prescription surface, which is usually concave, is given a spherical, aspherical, toric, atoric, progressive or free-form geometry (e.g. progressive surfaces) by means of a machining operation to remove material, depending on the desired optical effect. The typical conventional procedure during the machining of inner surfaces provides that, once the spectacle lens blank has been placed with its outer surface on a block piece, a cutting or turning machining process is carried out to produce the optically active shape, usually followed by a fine grinding or polishing process to achieve the required surface quality.

To accelerate the machining operation in the industrial manufacture of spectacle lenses, it is already known to machine two spectacle lenses at the same time. For example, as early as the 1980s, the companies Haruchika, Japan (U.S. Pat. No. 4,662,119) and Comes, Italy (see EP 0 090 752 A1 in the name of EFOP)—along with the Applicant—manufactured machines for machining spherical spectacle lenses; transfer lines for machining toric spectacle lenses were also produced by the Applicant. These transfer systems consisted of individual machines for grinding, fine grinding and polishing, which were loaded by means of integrated or external loading systems. Belts, linear cylinders or rails/push-rods were provided for transferring the spectacle lenses from one machining station to the next. Sometimes the machines were screwed onto a common base pedestal, and this ensured the precise positioning of the units with respect to one another which was required for transferring the workpieces. However, these were individual machines with separate working spaces, which were in each case loaded by means of separate loading devices and which in turn required additional devices for transferring the workpieces from one machining operation to the next.

Also known are cutting machines in particular for the pre-machining of spectacle lenses (EP 0 758 571 A1) and fast tool turning machines for the fine machining of plastic spectacle lenses, in which a turning tool can be moved highly dynamically either in a linearly reciprocating manner (WO 02/06005 A1) or in a rotational manner (WO 99/33611 A1), so that non-rotationally symmetrical lens surfaces can be produced in the turning process, and also combined cutting/turning machines (EP 1 291 106 A2). But whenever cutting and turning were carried out in one machine, the steps were carried out in series: the spectacle lens was firstly cut and then turned. During the cutting operation, the turning part of the machine was not used or was unable to be used, and on the other hand, during the turning operation, the cutting part was not used or was unable to be used, so that there were considerable idle times for the respective machining unit.

Starting from the above prior art, the aim is to find solutions which are able to considerably reduce the complexity required to date in respect of handling the workpiece in particular, using the CNC axes internal to the machine.

SUMMARY OF THE INVENTION

The object of the present invention is to provide a fully automated high-performance cutting and turning machine which is as cost-effective as possible, and to provide a corresponding method by means of which in particular all the customary plastic spectacle lens materials and all shapes including free-forms and optionally edge machining can be machined in an extremely short time with high machining performance and with high surface precision and quality.

According to a first aspect of the invention, when machining particularly spectacle lenses as workpieces by means of a machine which comprises at least one cutting unit and at least one turning unit in a common working space, at least two workpieces are machined at the same time in the working space, one of said workpieces being cut while the other is turned. For example, during the pre-machining of one spectacle lens by means of the cutting unit, which can be effected with a high machining performance, another spectacle lens can at the same time be further machined or finished with high surface precision and quality by means of the turning unit. As a result, it is possible to achieve in particular a very high throughput of spectacle lenses, and thus the method according to the invention and the machine according to the invention are particularly suitable for the industrial production of spectacle lenses.

According to a second aspect of the invention, a machine for machining particularly spectacle lenses as workpieces comprises at least one cutting unit with a machine frame and at least one turning unit with a machine frame, wherein the machine frames of the cutting unit and of the turning unit are essentially decoupled from one another in terms of vibration and delimit a common working space in which the workpieces can be machined at the same time by the cutting unit and the turning unit. The simultaneous cutting and turning machining of spectacle lenses which is thus possible ensures—as already mentioned above—a very high throughput of spectacle lenses (e.g. 140 spectacle lenses per hour). As a result of the fact that, according to the invention, the machine frames are largely decoupled in terms of vibration, surfaces of very high quality can be produced even if there is no downstream polishing process which would further increase the machining time of the individual spectacle lens.

According to a third aspect of the invention, a machine for machining particularly spectacle lenses as workpieces comprises at least two machining units, each of which comprises at least one tool and a workpiece spindle unit by means of which the workpiece to be machined can be moved in at least one axis direction running transversely to the respective tool, wherein the workpiece spindle units are arranged with respect to one another in such a way that said axis directions are essentially perpendicular to one another. By virtue of this arrangement of the workpiece spindle units, the machine according to the invention is firstly very compact. Secondly, it is possible to position the workpiece spindles with the spectacle lenses held thereon very closely next to one another or above one another, as a result of which an automatic workpiece changeover operation is possible which is very simple and also fast on account of the fact that the workpieces can be changed simultaneously.

With regard to the greatest possible vibration decoupling, it is preferred if the machine frames of the machining units do not make contact with one another. Continuing the concept of the invention, the machine frames of the machining units may be mounted on a common machine pedestal via vibration decoupling elements. However, it is in principle also conceivable that just one of the machine frames is mounted on the common machine pedestal via vibration decoupling elements, while the other machine frame is attached directly to the machine pedestal. The vibration decoupling elements are preferably commercially available air spring elements. For good vibration behaviour of the machine, it is furthermore advantageous if the machine frames of the machining units are made of polymer concrete, which provides a good damping effect.

Furthermore, each machining unit may be assigned a workpiece spindle unit which comprises a workpiece spindle with a workpiece rotation axis, wherein each workpiece spindle can be moved by means of a cross table arrangement in a CNC-controlled manner in a plane which contains the respective workpiece rotation axis. Although a distribution of the movements in said plane between workpiece and tool is also conceivable in principle in order to generate the relative movements between workpiece and tool which are required here for machining the workpiece, the arrangement with these movements on the tool side is nevertheless preferred with regard to an optimised vibration behaviour, in which the movements of the workpiece have no effect or only a very slight effect on the movements of the tool and vice versa.

Advantageously, the cross table arrangement of each workpiece spindle unit comprises guide rails and slides, wherein at least these elements, that is to say the guide rails and the slides, of the workpiece spindle units are designed as identical parts, which brings cost advantages in particular.

Furthermore, one of the machining units may be a turning unit comprising at least two fast tool arrangements which in each case have a shuttle for a turning tool, which shuttle can be moved axially by means of an actuator so as to move said turning tool in a fast tool movement plane. By means of such fast tool arrangements, any geometry can be machined very quickly and with a high surface precision and quality, particularly on spectacle lenses made of plastic. If the movements of the shuttles of the fast tool arrangements can be controlled independently of one another, the shuttles can be moved in particular in opposite directions so as to largely compensate any vibrations. The use of rotary fast tool arrangements is also conceivable in principle.

For a high workpiece throughput, it is also advantageous if the machining units can be simultaneously loaded with workpieces by means of a loading device. The loading device may advantageously comprise a head which can be pivoted about a pivot axis from a position in which it lies opposite a working box or a conveyor belt for the workpieces into the working space of the machine and vice versa. The head of the loading device may furthermore have a plurality of suction cups for picking up and holding the workpieces by means of vacuum, which suction cups can be extended in the axial direction via cylinders and are arranged on a common rotating disk which rotates about a rotation axis. Compared to a "mechanical" solution using grippers or the like which is also conceivable, such a "pneumatic" solution is advantageous in particular with regard to a high workpiece changeover speed with a low risk of damage to the workpieces. Finally, the arrangement may be such that the workpiece spindles of the machining units can be moved by means of the associated cross table arrangements transversely to the workpiece rotation axes into a loading/unloading position which can also be called a transfer position or changeover position in which the workpiece rotation axes are axially aligned with a respective cylinder of the head of the loading device which is positioned in the working space. The workpiece spindles can then be moved by means of the cross table arrangements along the workpiece rotation axes in the direction of the head of the loading device in order to change the workpieces, so that the CNC axes which are present in the machine in any case are advantageously also used for the workpiece changeover, and thus the loading device need not have any dedicated CNC axes.

Further features and advantages of the invention emerge from the following description of a preferred example of embodiment.

BRIEF DESCRIPTION OF THE DRAWINGS

The invention will be explained in more detail below on the basis of a preferred example of embodiment and with reference to the appended, partially schematic drawings, in which.

DETAILED DESCRIPTION OF THE EXAMPLE OF EMBODIMENT

Figure 1:
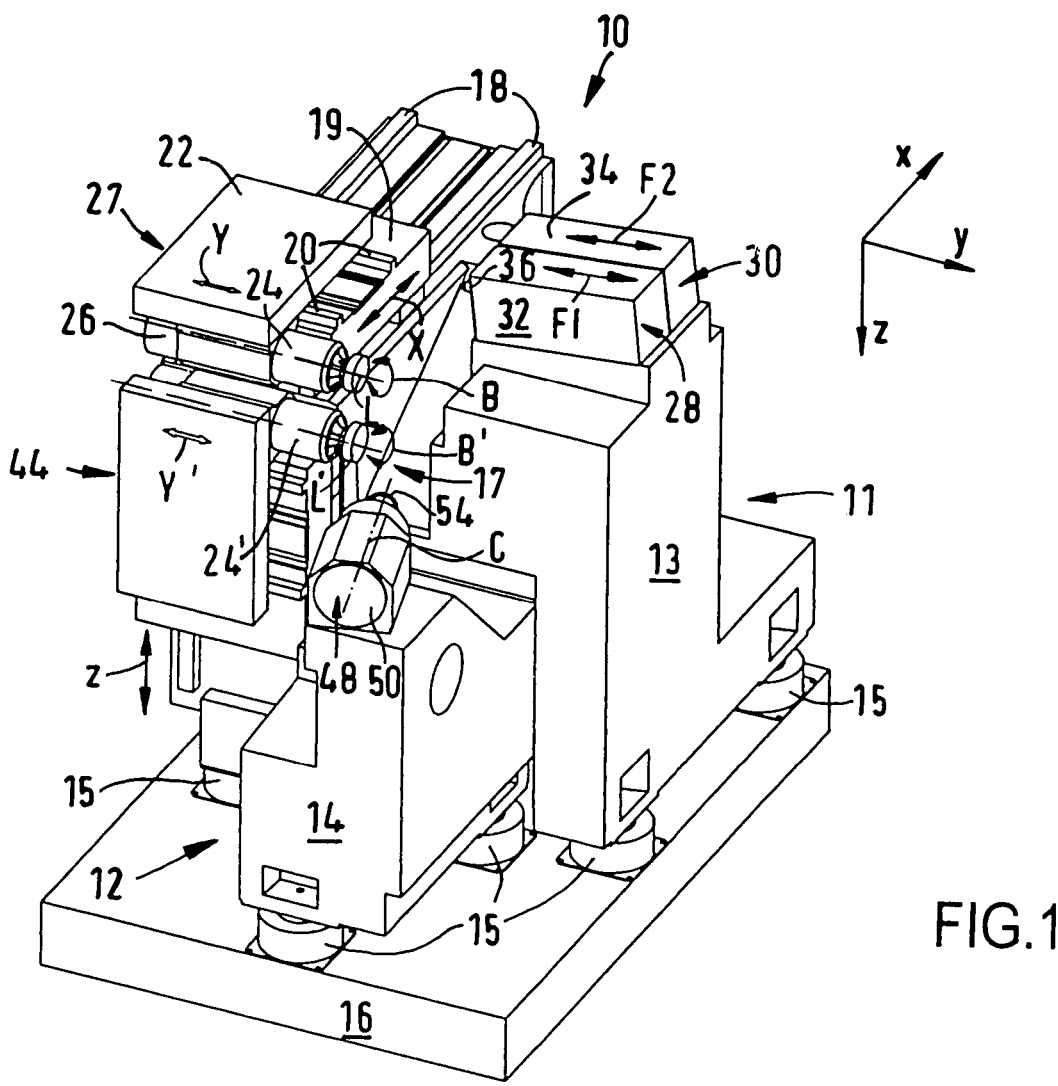
FIG. 1 shows a perspective view, obliquely from the front/right/above, of a high-performance cutting and turning machine according to the invention for machining spectacle lenses, which is equipped in tool terms with a cutting unit and two fast tool arrangements which form a turning unit, wherein the latter is assigned a first workpiece spindle unit while the cutting unit is assigned a second workpiece spindle unit.

FIGS. 1 to 11 show in a partially schematic manner a CNC-controlled high-performance cutting and turning machine 10 for machining spectacle lenses L made of plastic in a right-angled Cartesian co-ordinate system, in which the small letters x, y and z respectively denote the width direction (x), the length direction (y) and the height direction (z) of the machine 10. The casings and protective devices of the machine 10 have been omitted in the figures for the sake of clarity.

According to FIGS. 1 to 5, the machine 10 comprises a turning unit which is referenced 11 as a whole and a cutting unit which is referenced 12 as a whole, which are isolated from one another in terms of vibration. The turning unit 11 comprises a first machine frame 13 which is made of polymer concrete, while the cutting unit 12 comprises a second machine frame 14 which is also made of polymer concrete. The first machine frame 13 and the second machine frame 14, which do not make contact with one another, are mounted on a common machine pedestal 16 via suitable vibration decoupling elements, for example air spring elements 15, such as those available from EFFBE GmbH, Raunheim, Germany under the trade name "Level Mount®". The first machine frame 13 and the second machine frame 14 delimit a common working space 17, in which both the turning machining and the cutting machining are carried out.

Figure 11:
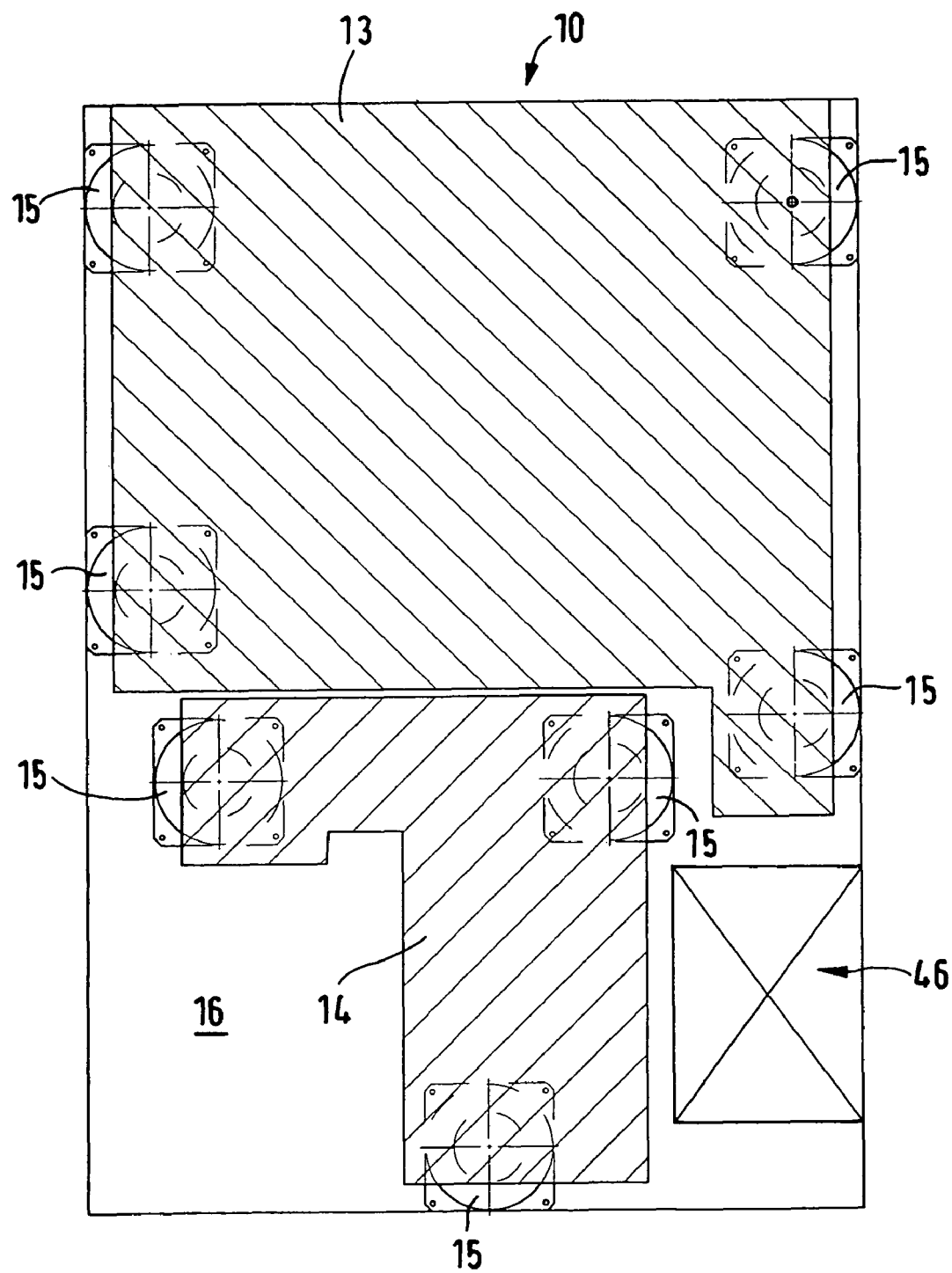
FIG. 11 shows a schematic sectional view of the machine of FIG. 2 along the section line XI-XI in FIG. 3, which illustrates the arrangement of air spring elements for mounting the machining units on a common machine pedestal.

As shown in FIG. 11 in particular, the first machine frame 13 has an essentially rectangular cross section while the second machine frame 14 has an essentially L-shaped cross section. The number and position of the air spring elements 15 by means of which the machine frames 13, 14 which are spaced apart from one another are supported with respect to the common machine pedestal 16 are in this case selected in such a way that four air spring elements 15 are provided for the first machine frame 13, said air spring elements being located in the region of the corners of the essentially rectangular cross section of the first machine frame 13, while three air spring elements 15 are provided for the second machine frame 14, with one air spring element 15 at the end of each leg of the essentially L-shaped cross section of the second machine frame 14 and one air spring element 15 in the region of the corner formed by the two legs of the cross section. The air spring elements 15 for the first machine frame 13 on the one hand and the air spring elements 15 for the second machine frame 14 on the other hand may be different from one another, in particular such that the first machine frame 13 belonging to the turning unit 11 is mounted in a softer manner with respect to the machine pedestal 16 than the second machine frame 14 belonging to the cutting unit 12. The air spring elements 15 may furthermore be connected to a compressed air source (not shown) via associated control valves (also not shown), so that air can optionally be supplied to or discharged from the air spring elements 15 pneumatically in order to maintain a defined position, that is to say operating height, of the respective air spring element 15 under the changing loads which occur during the machining operation carried out by the respective machining unit 11, 12.

Of the machining units 11, 12, firstly the turning unit 11 will be described in greater detail. On the left-hand side of the working space 17 in FIG. 1, two guide rails 18 which extend parallel to one another in the (horizontal) width direction x are fixed to an upper mounting surface of the first machine frame 13 in FIG. 1. An X-slide 19, which can be moved in a CNC-controlled manner in both directions of an X-axis by means of associated CNC drive and control elements (not shown), is displaceably mounted on the guide rails 18.

Two further guide rails 20, which extend parallel to one another in the (likewise horizontal) longitudinal direction y and perpendicular to the guide rails 18, are fixed to an upper mounting surface of the X-slide 19 in FIG. 1. A Y-slide 22 is displaceably mounted on the guide rails 20 in a cross table arrangement, which Y-slide can be moved in a CNC-controlled manner in both directions of a Y-axis by means of associated CNC drive and control elements (also not shown)

Fixed to a lower mounting surface of the Y-slide 22 in FIGS. 1 to 4 is a workpiece spindle 24 which can be driven in rotation about a workpiece rotation axis B by means of an electric motor 26, at a CNC-controlled rotation speed and rotation angle. The workpiece rotation axis B is aligned with the Y-axis. In order to machine the prescription surface of the spectacle lens L, the spectacle lens L which is mounted on a block piece is fitted on the workpiece spindle 24 in a manner known per se, or more specifically on the end thereof which projects into the working space 17, in such a way that said workpiece can rotate in the same axis as the workpiece spindle 24.

It is clear from the above description that the workpiece spindle 24 can be moved by means of the cross table arrangement (X-slide 19, Y-slide 22) in a CNC-controlled manner in an X-Y plane which contains the workpiece rotation axis B, while the spectacle lens L can rotate about the workpiece rotation axis B at a CNC-controlled rotation speed and rotation angle. These components form a first workpiece spindle unit 27 which is assigned to the turning unit 11.

Figure 5:
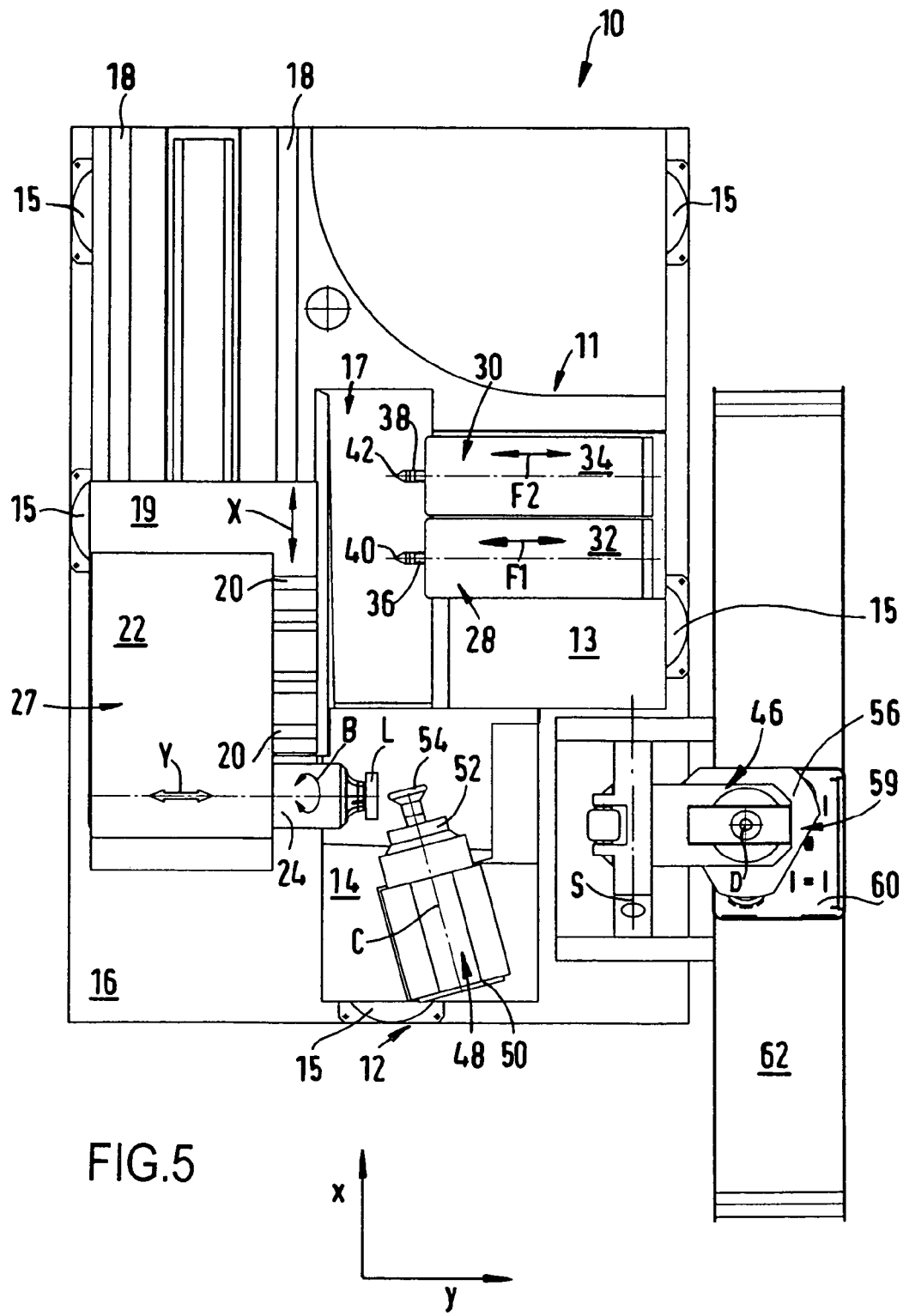
FIG. 5 shows a plan view of the machine of FIG. 2, seen from above in FIG. 3.

At least one fast tool arrangement, in the illustrated example of embodiment two fast tool arrangements 28, 30 arranged in parallel, is/are provided on the right-hand side of the working space 17 in FIGS. 1, 2, 3 and 5 (more than two fast tool arrangements are also conceivable in principle). As is known for example from WO 02/06005 A1, each fast tool arrangement 28, 30 comprises an actuator 32, 34 and a respectively associated shuttle 36, 38. While the shuttle 36 of the first fast tool arrangement 28 can be moved axially by means of the actuator 32 in both directions of a fast tool axis F1, the shuttle 38 of the second fast tool arrangement 30 can be moved axially by means of the actuator 34 in both directions of a second fast tool axis F2 which is parallel to the first fast tool axis F1. Here, the position and travel of the shuttles 36, 38 can be controlled independently of one another by means of CNC. As shown in FIG. 5, the fast tool axis F1, the fast tool axis F2, the Y-axis and the workpiece rotation axis B run in the same direction when seen in plan view. However, seen in the front view according to FIG. 3, the direction of the Y-axis and the workpiece rotation axis B on the one hand differs from the direction of the fast tool axis F1 and the fast tool axis F2 on the other hand.

In the illustrated example of embodiment, each of the shuttles 36, 38 has a turning tool 40, 42 at its end which projects into the working space 17 (see FIGS. 3 and 5 and 6 to 10), said turning tool being fixed to the respective shuttle 36, 38 in a manner not shown in any greater detail here, so that the turning tools 40, 42 can be moved in a fast tool movement plane (X-F1 plane and X-F2 plane, respectively). A cutter disk (not shown in any greater detail) is optionally applied releasably or as a coating to each turning tool 40, 42, which cutter disk forms a cutting edge and may consist of polycrystalline diamond (PCD), CVD, natural diamond or else hard metal with or without a wear-resistant coating, depending on the respective requirements, in particular depending specifically on the material to be machined.

By means of the fast tool arrangement(s) 28 (and optionally 30) of the turning unit 11, the prescription surface of the spectacle lens L which has been pre-machined by the cutting unit 12 can be post-machined by turning, and this takes place by controlling the movement of the spectacle lens L in the X-axis and optionally the Y-axis, that is to say in the X-Y plane, and by controlling the movement of the machining turning tool 40 (or 42) in the F1 axis (or F2 axis), that is to say in the X-F1 plane (or X-F2 plane). Here, the fast tool arrangements 28 and 30 can be (but do not have to be) actuated in such a way that the shuttle which is not involved in the turning machining operation moves in the opposite direction to the shuttle which is involved in the turning machining operation, so that the shuttles move virtually in opposite directions so as to prevent or reduce, due to mass compensation, the transmission of disruptive vibrations into the first machine frame 13, as disclosed in WO 02/06005 A1. As a result, in the turning machining operation, surface qualities can be achieved which are almost the same as the surface qualities which can be achieved by means of conventional polishing processes.

A special feature of the above-described machine 10 also consists in that, as already mentioned above in a more general manner, the fast tool arrangements 28 and 30 are mounted on a mounting surface of the first machine frame 13 which is tilted or placed at an angle α (see FIG. 3) with respect to the mounting surfaces for the cross table arrangement (X-slide 19, Y-slide 22) and the workpiece spindle 24, so that the fast tool movement plane (X-F1 plane or X-F2 plane) is at an angle with respect to the movement plane (X-Y plane) of the workpiece spindle 24 which contains the workpiece rotation axis B. In the illustrated example of embodiment, this angle α is approximately 5°, but may also be slightly greater or slightly smaller, for example may lie within the range from 2° to 10°.

By virtue of this measure, a movement of the turning tool 40 by means of the fast tool arrangement 28 in the F1 axis or a movement of the turning tool 42 by means of the fast tool arrangement 30 in the F2 axis results in two movement components being impressed on the movement of the respective cutting edge, namely a movement component in the longitudinal direction y of the machine 10 and a movement component in the height direction z of the machine 10. The latter can be used to align the working point of the cutting edge of the respective turning tool 40, 42 with the workpiece rotation axis B of the workpiece spindle 24, in order to compensate height errors or differences of the cutting edge in the height direction z.

The cutting unit 12 will now be discussed, to the extent which appears necessary for an understanding of the present invention. The cutting unit 12 is assigned a second workpiece spindle unit 44 which is mounted on the second machine frame 14, as can be seen in particular from FIGS. 4 and 6 to 10. Since the second workpiece spindle unit 44 corresponds in principle to the first workpiece spindle unit 27 in terms of its structure and function—it is even possible to use identical parts (e.g. guide rails, slides, workpiece spindles, drives and control elements) for the two workpiece spindle units—it will be discussed here only in respect of its particular features. One essential aspect here is the fact that the second workpiece spindle unit 44—which by means of its cross table arrangement allows a movement of the workpiece spindle 24' in a CNC-controlled manner in the axes Y' and Z in a Y'-Z plane which contains the workpiece rotation axis B' of the workpiece spindle 24', while the spectacle lens L' can be rotated about the workpiece rotation axis B' at a CNC-controlled rotation speed and rotation angle—is oriented perpendicular to the first workpiece spindle unit 27 which in the illustrated example of embodiment runs horizontally, so that the respective movement planes (X-Y plane and Y'-Z plane) of the workpiece spindles 24, 24' run perpendicular to one another. As a result, firstly a particularly compact structure is achieved. Secondly, fully automatic, very fast, simultaneous loading of the two machining units 11 and 12 of the machine 10 by means of a triple suction-cup loading device 46 is possible, as will be explained in more detail below.

In FIGS. 1 to 3 and 6 to 10, a cutter spindle unit 48 is mounted on an upper surface of the second machine frame 14 in front of the working space 17, the structure and function of said cutter spindle unit being known in principle from EP 0 758 571 A1 by the Applicant. As shown in particular in FIGS. 5 to 10, the cutter spindle unit 48 comprises a cutter spindle 52 which can be driven about a cutter rotation axis C at a controlled rotation speed by means of an electric motor 50, a cutting tool 54 being mounted at the end of said cutter spindle which projects into the working space 17.

By means of the cutter spindle unit 48, it is possible to carry out on the spectacle lens L1 a cutting machining operation which—according to the teaching of EP 0 758 571 A1—comprises a grooving step in which the cutting tool 54 rotating about the cutter rotation axis C at a controlled rotation speed and the spectacle lens L' rotating about the workpiece rotation axis B' at a controlled rotation angle are moved relative to one another in a positionally controlled manner in at least one of the two axis directions Y' and Z in such a way that the cutting edges of the cutting tool 54 produce an annular, trough-like recess at least in the region of the outer edge of the spectacle lens L', before the cutting tool 54 is guided over the spectacle lens L' from the outside inwards in a shaping operation along a spiral-shaped path by controlling the movement path of the spectacle lens L1 in the Y'—and Z-axes, that is to say in the Y'-Z plane, so as to remove further material. Optional, but preferred, steps which are carried out during this cutting machining operation include edge machining and faceting of the spectacle lens L'. During edge machining, machining of the spectacle lens blank is carried out for example to the outer contour defined by the shape of the spectacle frame, by means of the rotating cutting tool 54, whereas, during faceting, the upper and/or inner peripheral edge of the spectacle lens blank is bevelled or rounded by means of the rotating cutting tool 54. These method steps have long been known to the person skilled in the art and therefore will not be discussed in any greater detail here.

It is clear from the above description that both machining operations—cutting (pre-machining) and turning (finishing)—take place in a common working space 17, whereby the cutting unit 12 and the turning unit 11 require just one common handling system, one common control system and just one operating panel (not shown). However, this "twin" machine 10 is no larger than a single machine, but rather has a storage space which corresponds essentially to that of a single machine. A high throughput of the machine 10 is ensured due to the fact that, during the cutting machining of one spectacle lens L' by the cutting unit 12, a second spectacle lens L can be machined on the turning unit 11 at the same time. The fact that the cutting unit 12 and the turning unit 11 are arranged in such a way that the two workpiece chucks can be positioned very closely next to one another or above one another in one working space 17 means that the handling, that is to say the workpiece changeover operation, is considerably simplified.

However, these measures which are advantageous for reducing costs and simplifying automation pose a considerable problem in respect of the machining operation: fast tool fine turning machining of spectacle lenses is an ultraprecise turning process which reacts very sensitively to external vibrations. The required precision of the turned spectacle lens surfaces lies in the sub-micrometre range and the Ra values lie in the two-figure nanometre range. By contrast, during the cutting machining operation on the adjacent machine unit 12, a not inconsiderable mass of the second workpiece spindle unit 44 of approximately 80 kg moves at relatively high accelerations and distances of up to 14 mm, which in turn leads to vibrations in the second machine frame 14. These disruptive vibrations must be kept away from the turning unit 11 during the fine turning of the optical surface. To this end, the aforementioned air spring elements 15 are provided as vibration-absorbing means between the common machine pedestal 16 and the machine frames 13, 14 of the turning unit 11 and cutting unit 12.

As already mentioned, by virtue of the right-angled arrangement of the cross tables, which respectively bear the workpiece spindles 24, 24' of the machine units 11, 12, the two workpiece spindles 24, 24' together with the workpieces L, L' can be positioned very closely above one another for automatic loading purposes, in order thus to ensure a simple and fast loading and unloading operation. A loading device 46 is provided as the handling system for loading and unloading purposes, which loading device will now be explained in more detail with reference to FIGS. 6 to 10.

The loading device 46 operates by means of three suction cups 58—referred to together as suction head 59 for short—which can be extended in the axial direction via cylinders 57 and are arranged on a common rotating disk 56, which suction cups can simultaneously hold the blank, the cut lens and the turned lens. For rapid changeover of parts, the suction head 59 merely has to move towards the two parallel workpiece holders on the workpiece spindles 24, 24', remove the machined lenses, index them and then place the blank into the holder on the workpiece spindle 24' of the cutter unit 12 and the cut lens into the holder on the workpiece spindle 24 of the turning unit 11. Once the triple suction head 59 has moved back, the protective device (not shown in the figures) of the machine 10 closes and the cutting and turning machining of the two lenses starts. During this machining operation, the suction head 59 deposits the machined lens in a working box 60 and picks up a new blank for the next machining operation, and then the suction head 59 is moved to a waiting position. As soon as the machining of the two lenses has finished, another loading and unloading operation takes place. This loading and unloading operation is shown in more detail in FIGS. 2 and 6 to 10.

Figure 2:
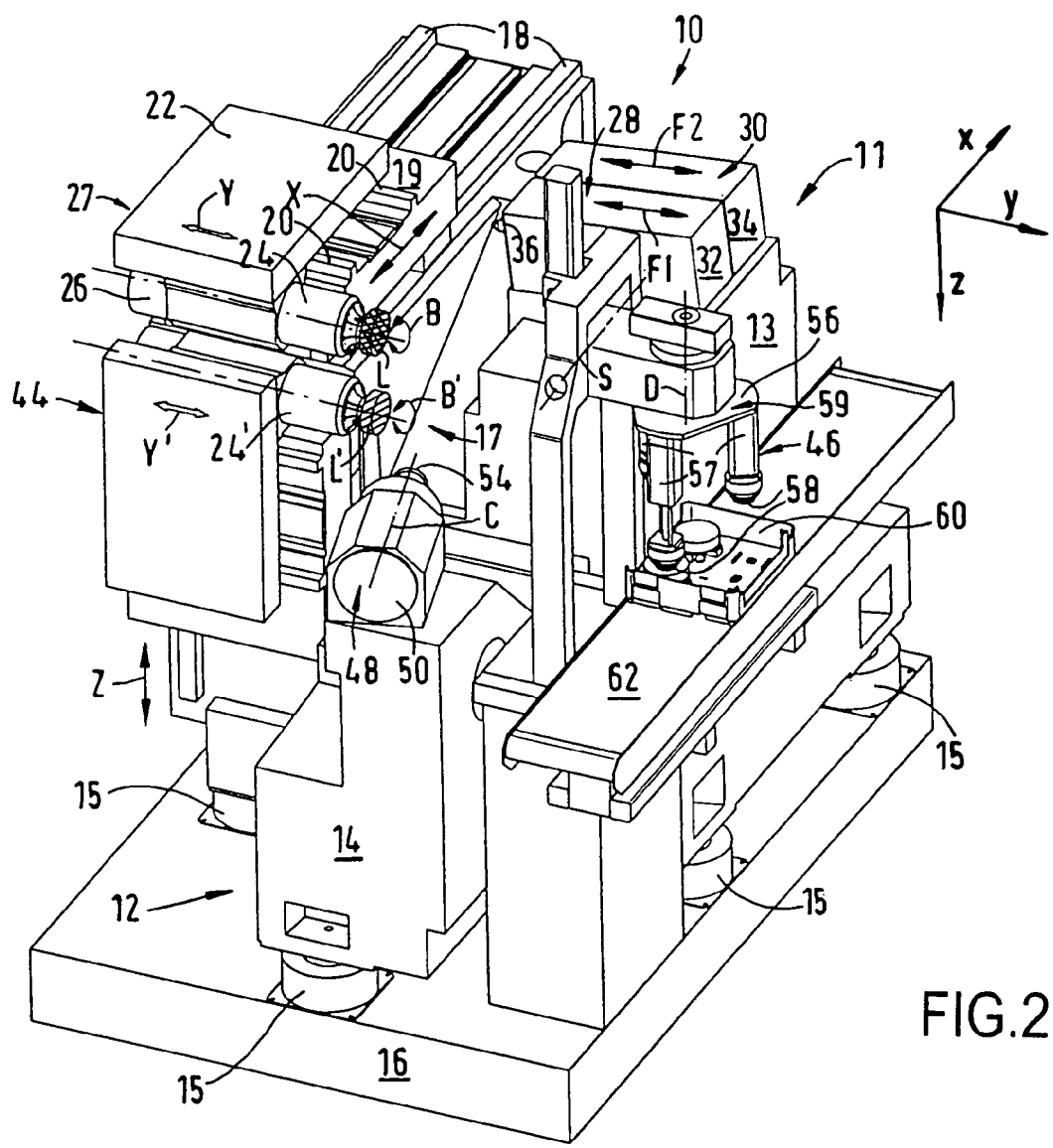
FIG. 2 shows a perspective view, obliquely from the front/right/above, of the machine of FIG. 1 with an additionally provided loading device for the workpiece changeover operation.
Figure 3:
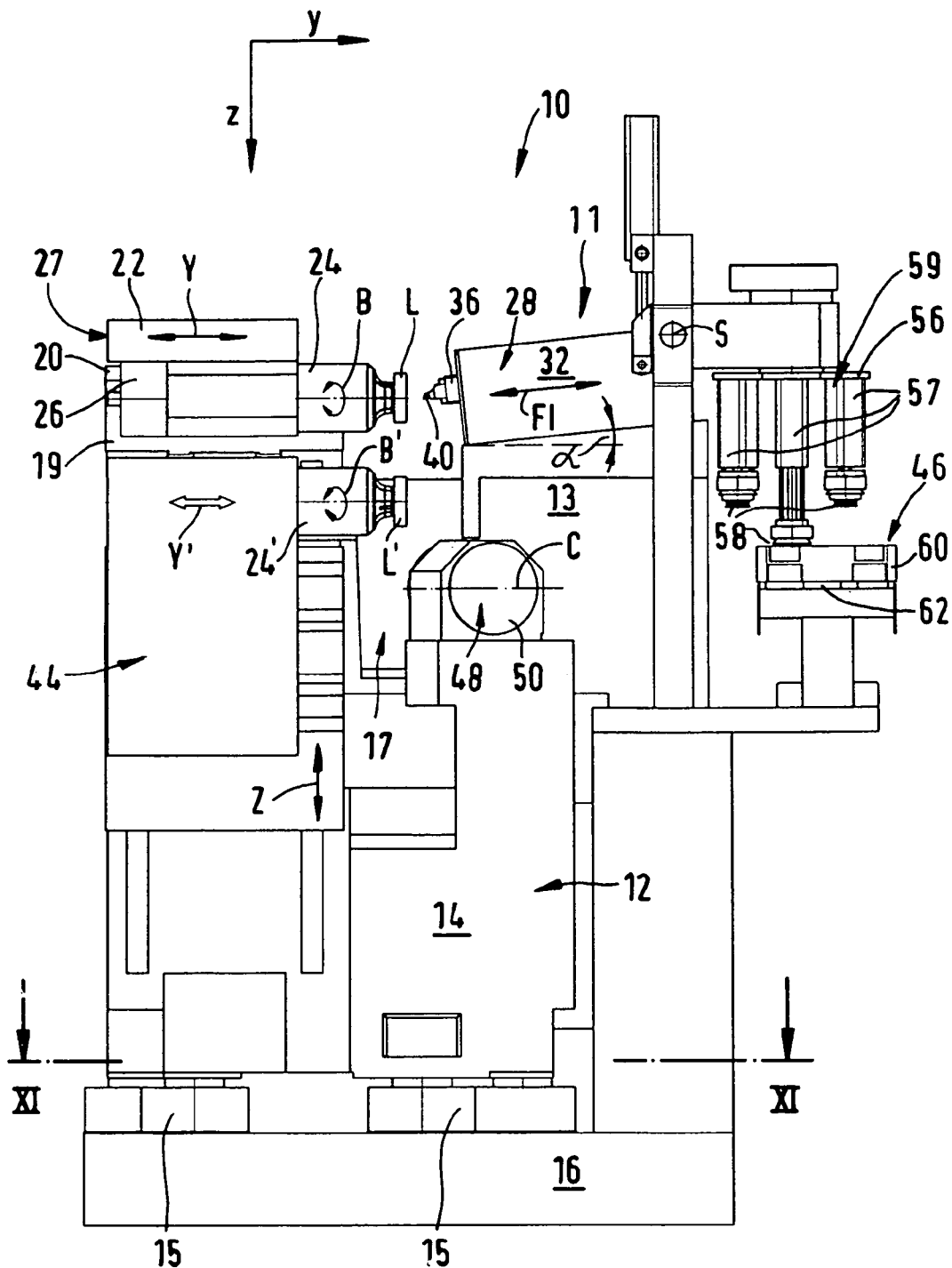
FIG. 3 shows a front view of the machine of FIG. 2.
Figure 4:
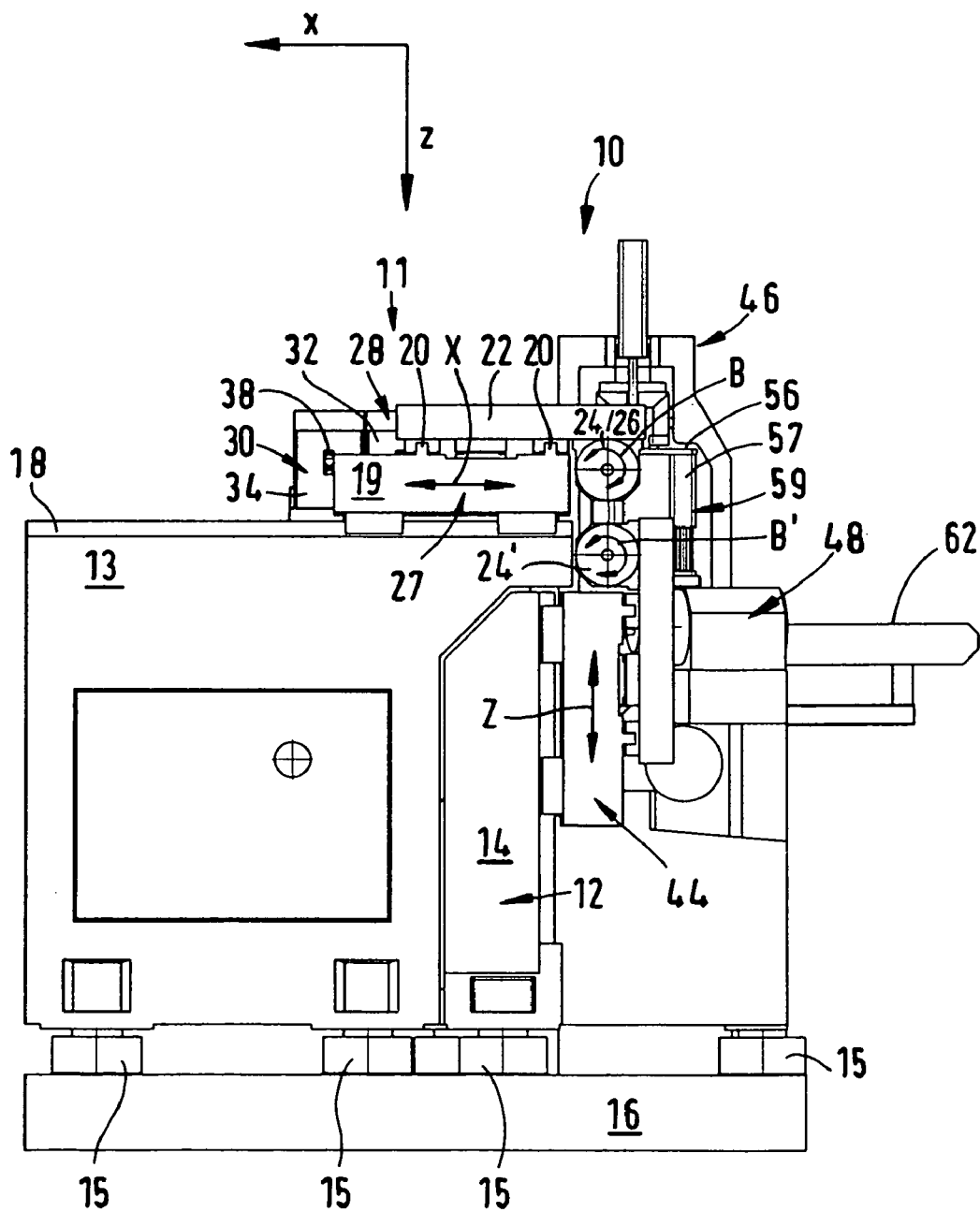
FIG. 4 shows a side view of the machine of FIG. 2, from the left in FIG. 3.
Figure 6:
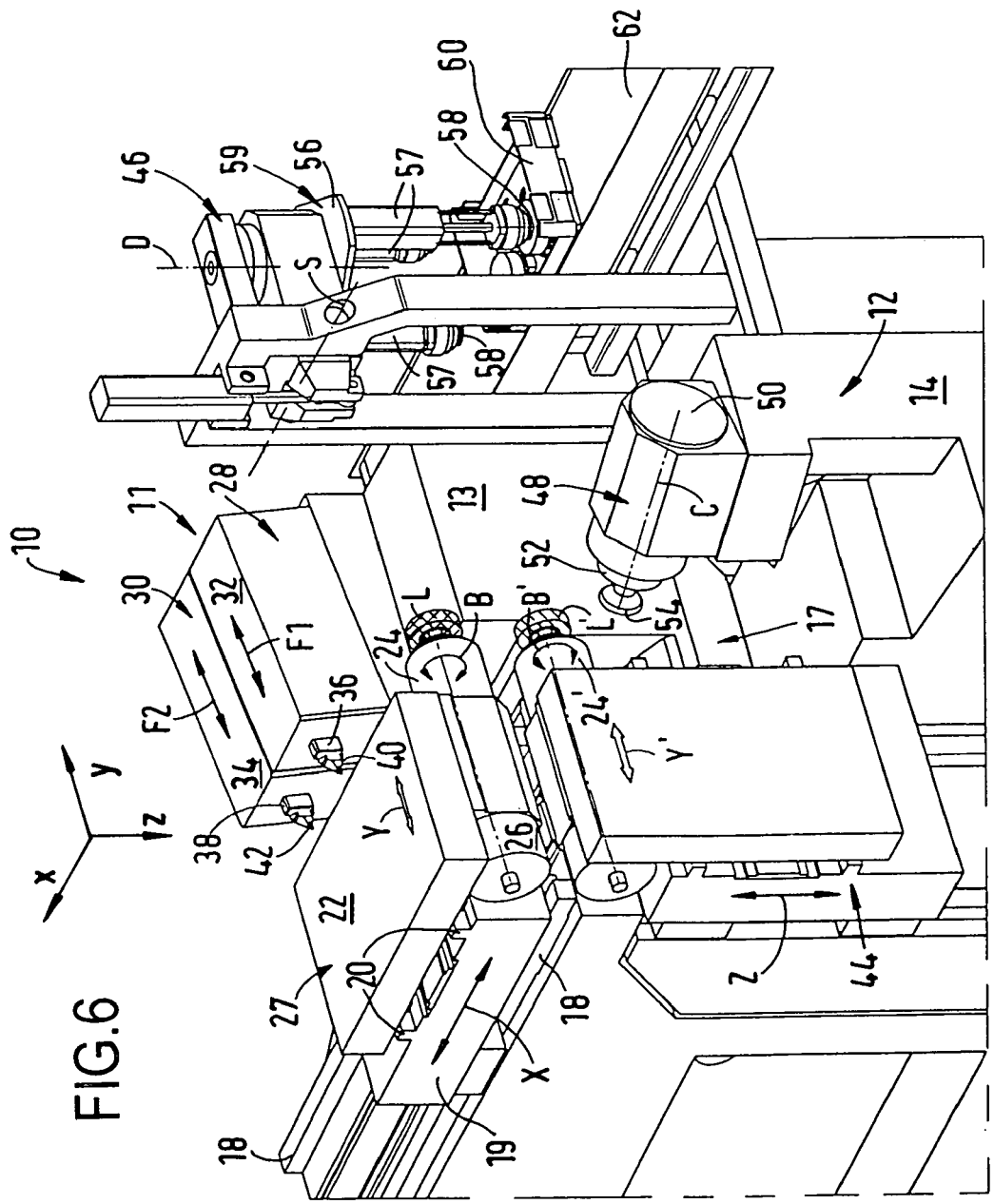
FIGS. 6 to 10 show perspective views, obliquely from the front/left/above, of the machine of FIG. 2, which illustrate a workpiece changeover operation.

In FIGS. 2 and 6, the semi-finished part (shown by right-sloping hatching) is held on the workpiece spindle 24' of the cutting unit 12, while the finished part (shown by cross-hatching) is held on the workpiece spindle 24 of the turning unit 11. Both workpiece spindles 24, 24' are located in the loading/unloading position, as can be seen from the position in the x-direction (workpiece spindle 24) and in the z-direction (workpiece spindle 24'). The working box 60 containing the blank (not hatched) is in the position for loading and unloading.

Figure 7:
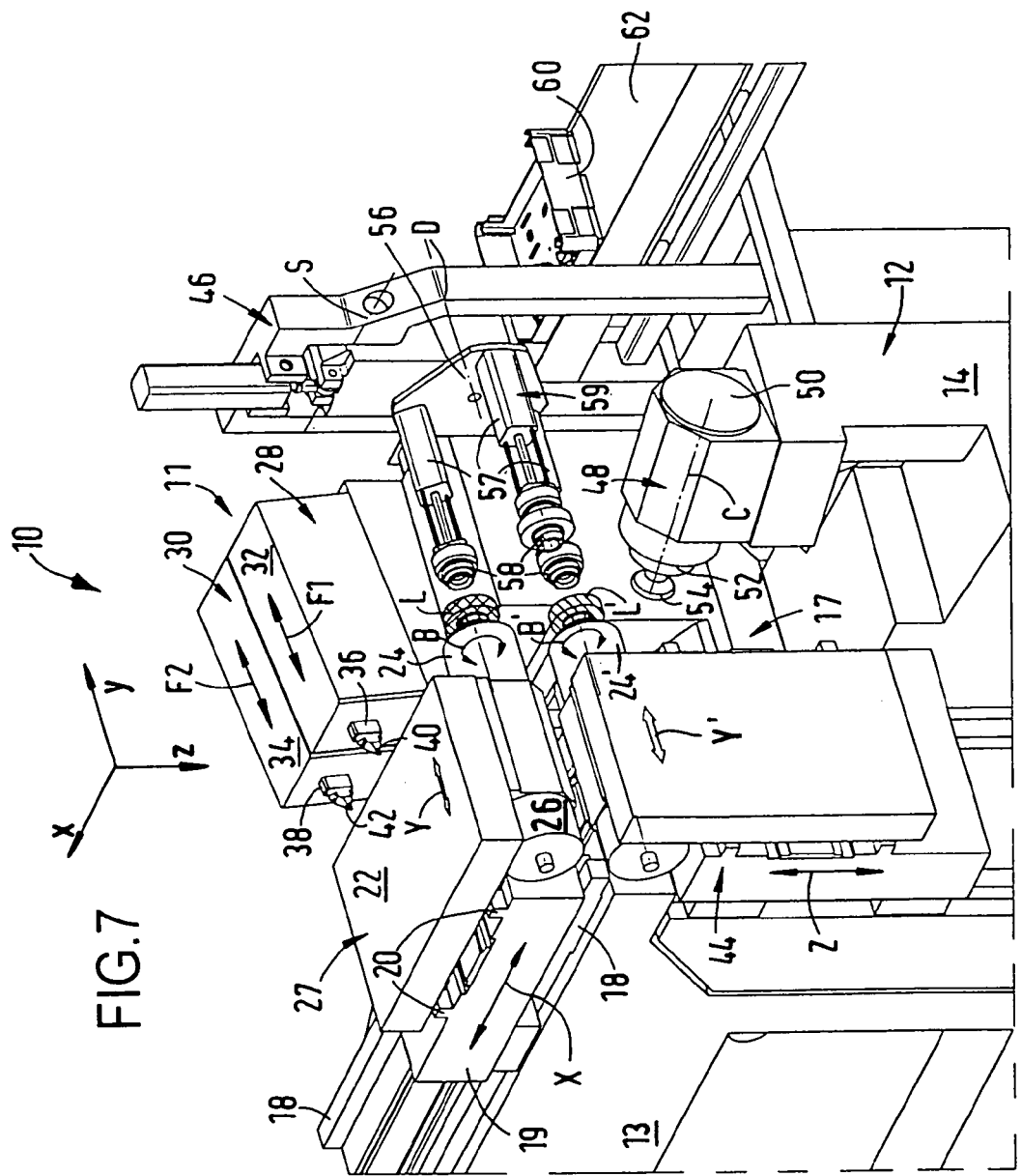

A cylinder 57 is located above the blank, extends outwards and picks up the blank with its suction cup 58 by means of vacuum. The cylinder 57 then retracts again. Thereafter, the suction head 59 is pivoted through 90° about a pivot axis S into the working space 17. Once the 90° position has been reached, the two left-hand cylinders 57 of the suction head 59 in FIG. 7 are in an axially aligned position with respect to the workpiece rotation axes B, B' of the workpiece spindles 24, 24' of the turning unit 11 and of the cutting unit 12. All the cylinders 57 are extended.

Figure 8:
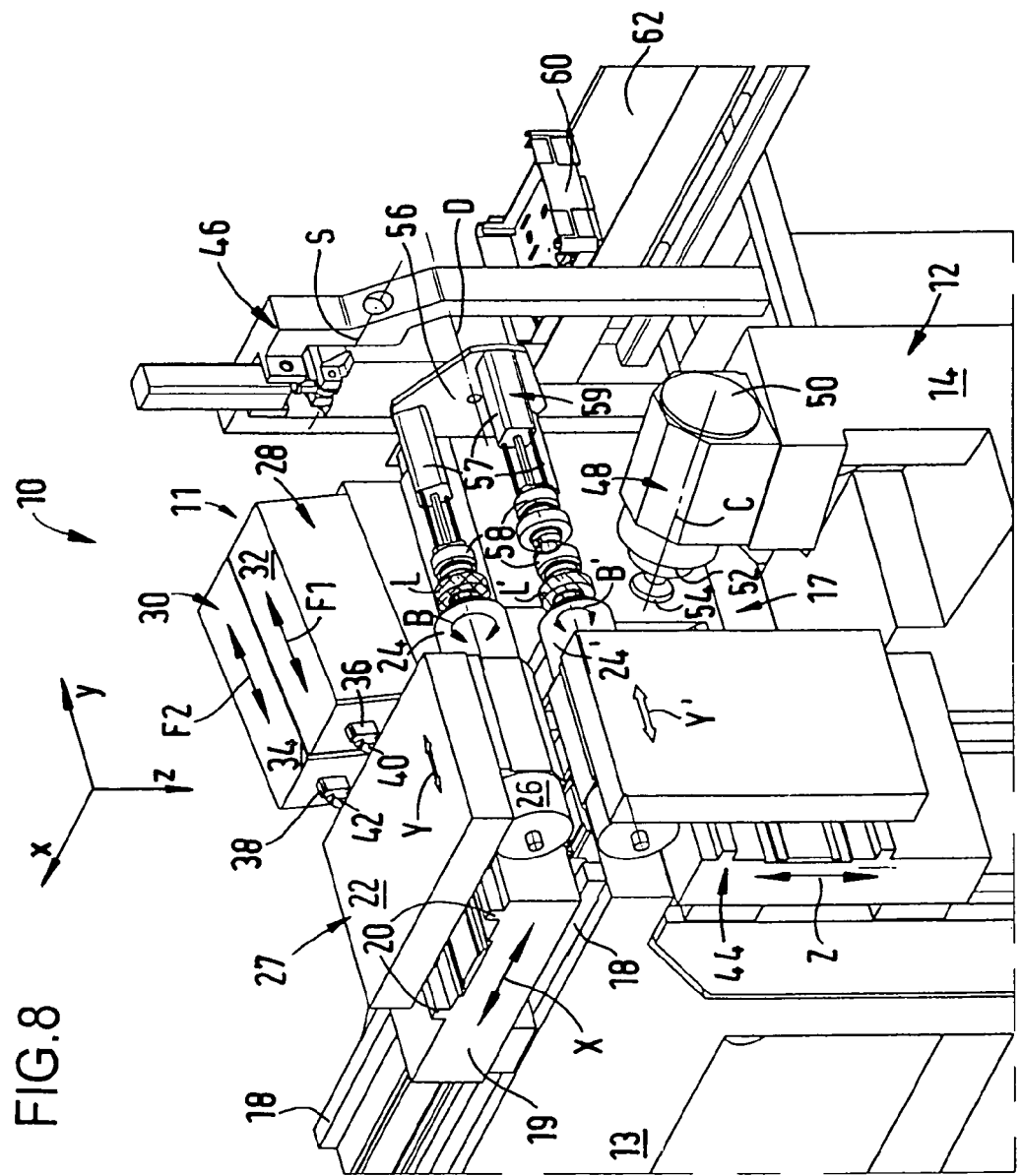

The workpiece spindles 24, 24' are then moved in the direction of the suction head 59 by means of corresponding actuation of the Y-axis of the first workpiece spindle unit 27 and of the Y'-axis of the second workpiece spindle unit 44, as shown in FIG. 8. The suction cups 58 on the respective cylinders 57 are then located on the semi-finished part and finished part.

Figure 9:
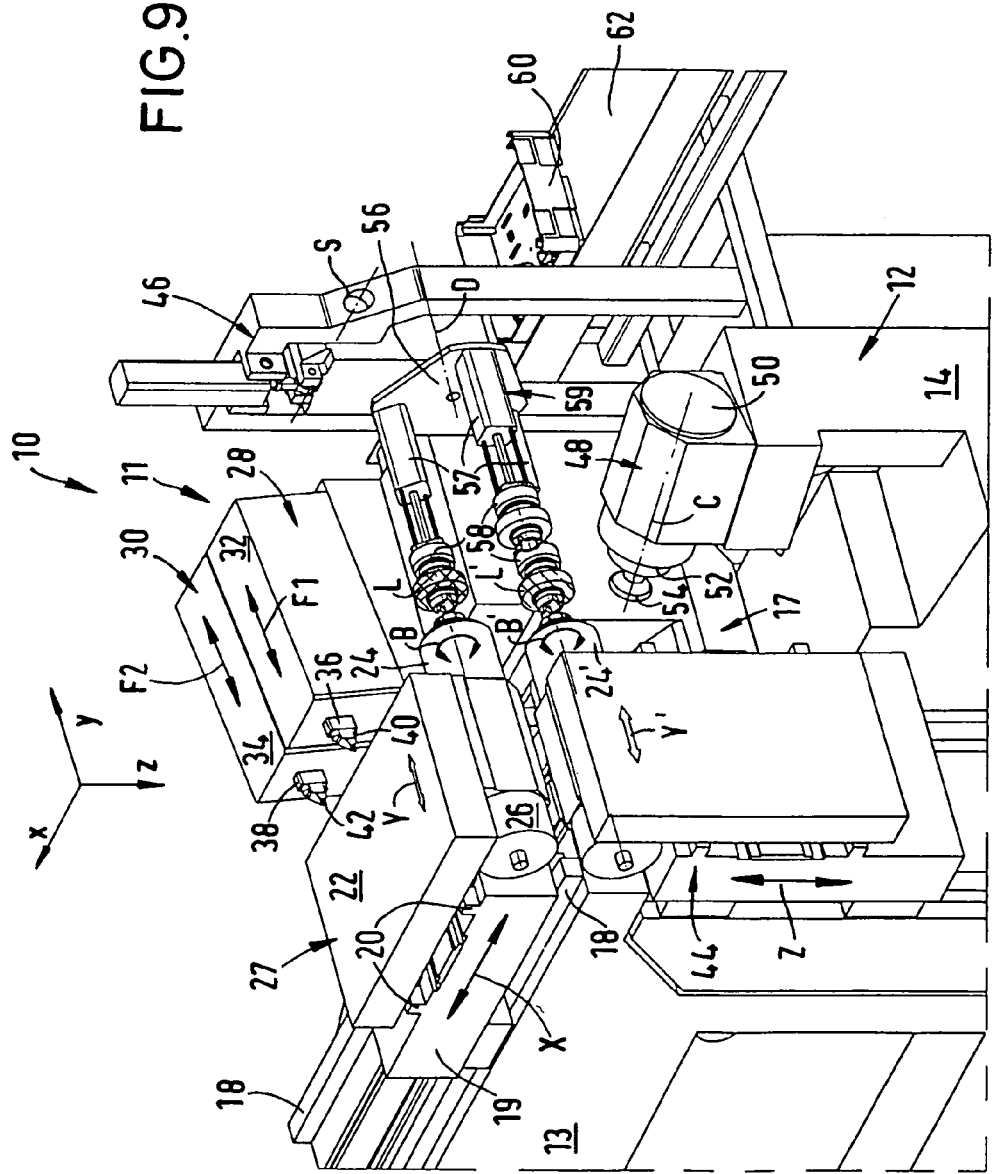

The semi-finished part and the finished part are then picked up by the suction cups 58, whereupon the workpiece spindles 24, 24', following detachment of the workpieces, are moved back again by actuation in the Y-axis and the Y'-axis. The semi-finished part and the finished part are then held on the suction cups 58 (FIG. 9).

The rotating disk 56 is then rotated through 120° about its rotation axis D. While the blank reaches the position of the workpiece rotation axis B' of the cutting unit 12, the semi-finished part reaches the position of the workpiece rotation axis B of the turning unit 11. At the same time, the finished part is pivoted from the position of the workpiece rotation axis B of the turning unit 11 to the "free" position. The blank can then be placed onto the workpiece spindle 24' of the cutting unit 12 and at the same time the semi-finished part can be placed onto the workpiece spindle 24 of the turning unit 11, and for this the Y-axis and Y'-axis are actuated accordingly.

Figure 10:
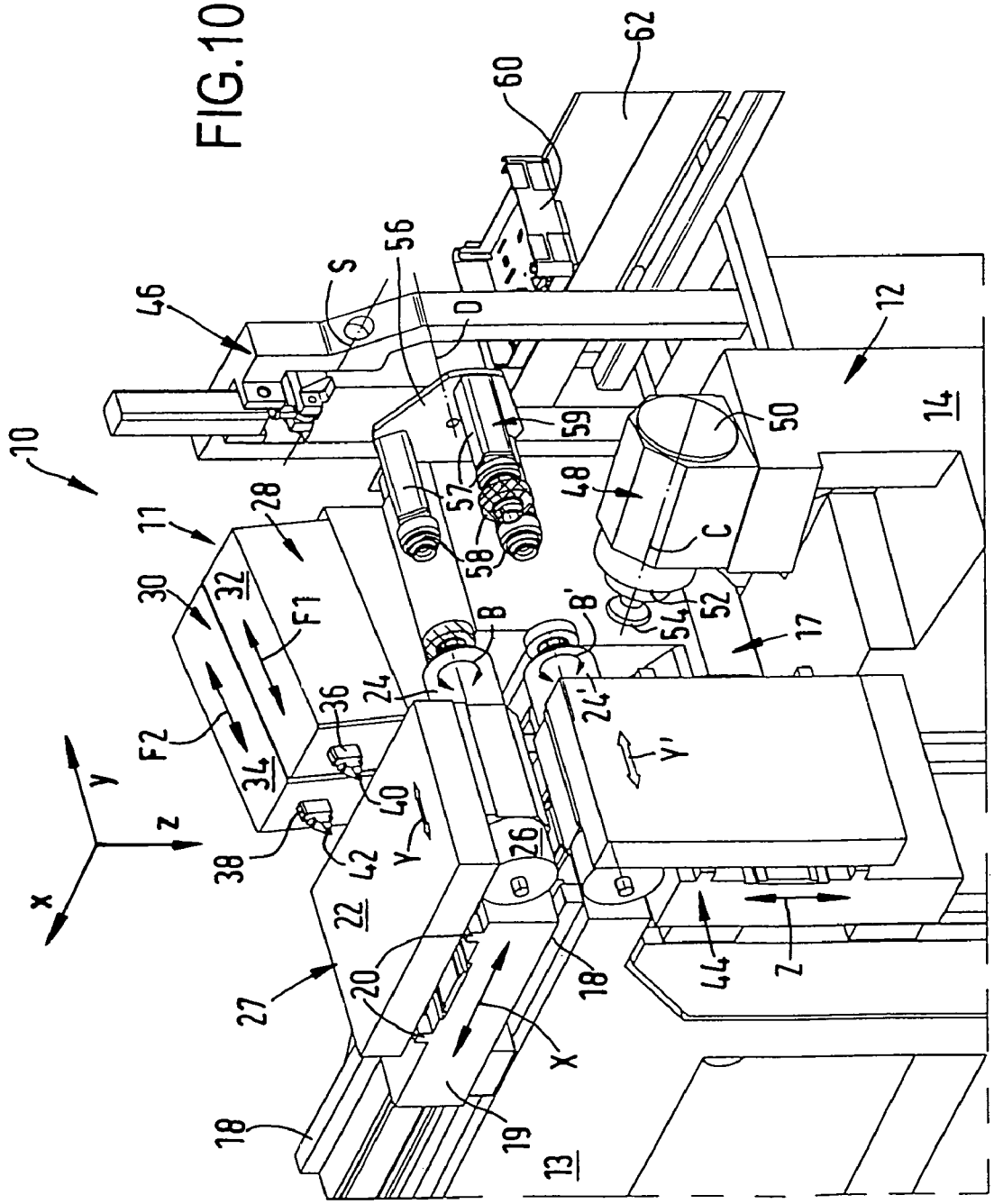

Once the blank and the semi-finished part have been placed onto the workpiece spindles 24 and 24', the Y- and Y'-axes are moved back, resulting in the state shown in FIG. 10. The cylinders 57 are then retracted and the suction head 59 is moved out of the working space 17 by pivoting about the pivot axis S, so that the finished part—by means of corresponding actuation of the cylinder 57—can be deposited in the working box 60 while the blank is being machined by cutting in the cutting unit 12 and the semi-finished part is being machined by turning in the turning unit 11.

After the machining operation, the loading and unloading operation can start again. For this, a new working box 60 is moved below the suction head 59 by means of a conveyor belt 62 of the loading device 46, while the old working box 60 is at the same time moved away from the loading/unloading position by the conveyor belt 62.

In summary, there is disclosed inter alia a method for machining particularly spectacle lenses by means of a machine which comprises at least one cutting unit and at least one turning unit in a common working space, wherein at least two spectacle lenses are machined at the same time in the working space, one of said spectacle lenses being cut while the other is turned. Further aspects of the proposed machine consist in that the machine frames of the cutting unit and of the turning unit are essentially decoupled from one another in terms of vibration and/or at least two machining units of the machine comprise workpiece spindle units for generating a transverse movement of the spectacle lens to be machined with respect to the respective tool, said workpiece spindle units being arranged essentially perpendicular to one another. As a result, it is possible for spectacle lenses to be machined in an extremely short time with high machining performance and with high surface precision and quality.

Other variations and modifications are possible without departing from the scope and spirit of the present invention as defined by the appended claims.

We claim:

1. A method for machining spectacle lenses as workpieces by means of a machine which comprises a cutting unit with a first machine frame and a turning unit with a second machine frame, and a common machine pedestal for mounting said machine frames, wherein said machine frames delimit a common working space, wherein at least two spectacle lenses are machined at the same time in the working space, one of said spectacle lenses being cut by the cutting unit while the other is turned by the turning unit, and wherein said machine frames are essentially decoupled from one another in terms of vibration in that at least one of said machine frames is mounted on the common machine pedestal via vibration decoupling elements in the form of spring elements.

2. A machine for machining spectacle lenses, comprising a cutting unit with a first machine frame, a turning unit with a second machine frame, and a common machine pedestal for mounting said machine frames, wherein said machine frames delimit a common working space in which the spectacle lenses can be machined at the same time by the cutting unit and the turning unit, and wherein said machine frames are essentially decoupled from one another in terms of vibration in that at least one of said machine frames is mounted on the common machine pedestal via vibration decoupling elements in the form of spring elements.

3. A machine according to claim 2, wherein the machine frame of the cutting unit and the machine frame of the turning unit do not make contact with one another.

4. A machine according to claim 2, wherein both the machine frame of the cutting unit and the machine frame of the turning unit are mounted on the common machine pedestal via vibration decoupling elements.

5. A machine according to claim 4, wherein the vibration decoupling elements are air spring elements.

6. A machine according to claim 2, wherein the machine frames of the cutting and turning units are made of polymer concrete.

7. A machine according to claim 2, wherein each of the cutting and turning units is assigned a respective workpiece spindle unit which comprises a workpiece spindle with a workpiece rotation axis, wherein each workpiece spindle can be moved by means of a cross table arrangement in a CNC-controlled manner in a plane which contains the respective workpiece rotation axis.

8. A machine according to claim 7, wherein the cross table arrangement of each workpiece spindle unit comprises guide rails and slides, wherein at least the guide rails and the slides of the workpiece spindle units are designed as identical parts.

9. A machine according to claim 2, wherein the turning unit comprises at least two fast tool arrangements which in each case have a shuttle for a turning tool, which shuttle can be moved axially along its own longitudinal axis by means of an actuator so as to move said respective turning tool in a fast tool movement plane.

10. A machine according to claim 9, wherein the movements of the shuttles of the fast tool arrangements can be controlled independently of one another, so that the shuttles can be moved in opposite directions along their respective longitudinal axes.

11. A machine according to claim 2, wherein the cutting and turning units can be simultaneously loaded with spectacle lenses by means of a loading device.

12. A machine according to claim 11, wherein the loading device comprises a head which can be pivoted about a pivot axis from a position in which the head lies opposite to one selected from the group consisting of a working box and a conveyor belt for the spectacle lenses to a position into the working space of the machine and vice versa.

13. A machine according to claim 11, wherein the loading device comprises a head which has a plurality of suction cups for picking up and holding the spectacle lenses by means of a vacuum, which suction cups can be extended in the axial direction of the suction cups via cylinders and are arranged on a common rotating disk which rotates about a rotation axis.

14. A machine according to claim 13, wherein each of the cutting and turning units is assigned a respective workpiece spindle unit which comprises a workpiece spindle with a work piece rotation axis, wherein each workpiece spindle can be moved by means of a cross table arrangement transversely to the respective workpiece rotation axis into a transfer position in which the respective workpiece rotation axis is axially aligned with a longitudinal axis of a respective one of the cylinders of the head of the loading device which is positioned in the working space, whereupon the workpiece spindles can be moved by means of the cross table arrangements along the workpiece rotation axes in a direction of the head of the loading device in order to change the spectacle lenses.

15. A machine according to claim 2, wherein each of the cutting and turning units comprises at least one tool and a workpiece spindle unit by means of which the spectacle lens to be machined can be moved in at least one axis direction running transversely to a longitudinal axis of the respective tool, wherein the workpiece spindle units are arranged with respect to one another in such a way that said axis directions running transverse to said longitudinal axis are essentially perpendicular to one another.

* * * * *